United States Patent [19]

Kennedy

[11] Patent Number: 5,111,923

[45] Date of Patent: May 12, 1992

[54] RAMPED CLUTCH PLATE FOR A VISCOUS FLUID CLUTCH

[75] Inventor: Lawrence C. Kennedy, Kettering, Ohio

[73] Assignee: General Motors Corporation, Detroit, Mich.

[21] Appl. No.: 688,769

[22] Filed: Apr. 22, 1991

[51] Int. Cl.$^5$ .................................................. F16D 35/00
[52] U.S. Cl. ................................................... 192/58 B
[58] Field of Search ......................... 192/58 B, 58 A; 123/41.12

[56] References Cited

U.S. PATENT DOCUMENTS

| | | | |
|---|---|---|---|
| 3,263,783 | 8/1966 | Sutaruk | 192/58 B |
| 3,268,041 | 8/1966 | Roper | 192/58 B |
| 3,419,122 | 12/1968 | Connelly | 192/58 B X |
| 3,559,785 | 2/1971 | Weir | 192/58 B |
| 3,584,716 | 6/1971 | Coty | 192/58 B |
| 3,856,122 | 12/1974 | Leichliter | 192/58 B |
| 3,983,980 | 10/1976 | Weintz | 192/58 B |
| 3,990,556 | 11/1976 | Hayashi et al. | 192/58 B |
| 4,958,709 | 9/1990 | Kennedy | 192/58 B |

FOREIGN PATENT DOCUMENTS 3122960 1/1983 Fed. Rep. of Germany .... 192/58 B

*Primary Examiner*—Richard Lorence
*Attorney, Agent, or Firm*—A. Michael Tucker

[57] ABSTRACT

A viscous fluid clutch includes a clutch plate rotatably driven by an input shaft. The clutch plate includes a plurality of concentric, annular lands and grooves in a rear face which are mated with complementary lands and grooves of a clutch body to form a shear zone. A plurality of passages are provided in the clutch plate lands and grooves for directing fluid from a reservoir to the shear zone. A first system of arcuate ramps are provided in a front surface of the clutch plate facing a pump plate of the clutch. The arcuate ramps are radially aligned with pump plate orifices and enhance the pump-out of fluid through the orifices. If desired, a second system of circumferential ramps can be provided about the periphery of the clutch plate to enhance the pump-out of fluid.

4 Claims, 2 Drawing Sheets

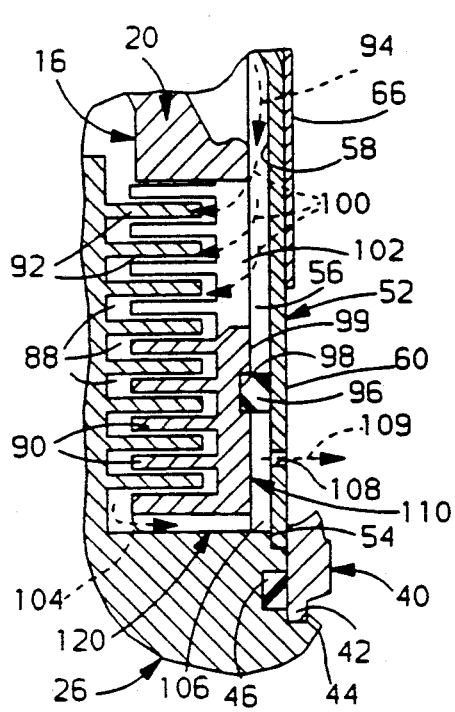
FIG.2
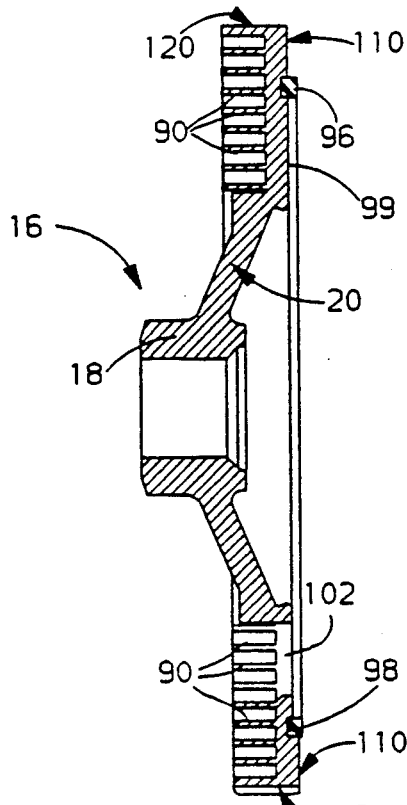
FIG.4
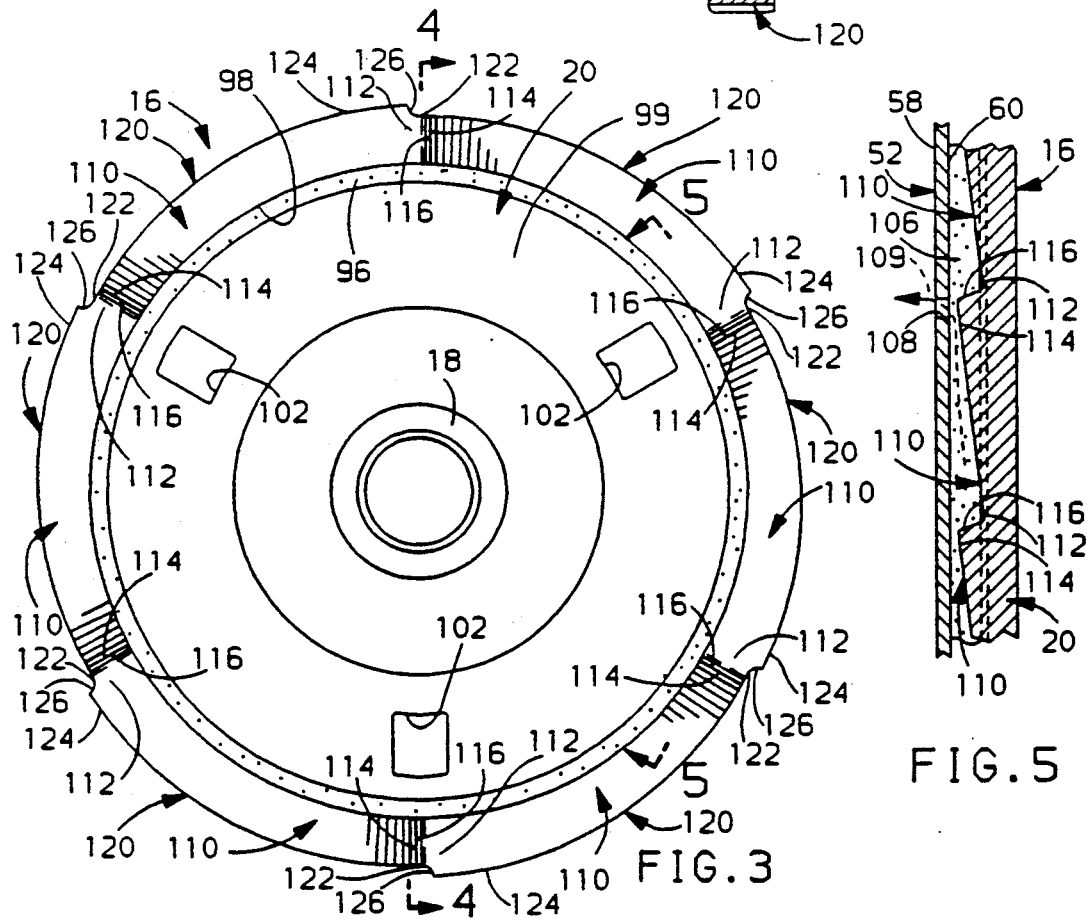
FIG.3
FIG.5

RAMPED CLUTCH PLATE FOR A VISCOUS FLUID CLUTCH

BACKGROUND OF THE INVENTION

1. Field of the Invention

The present invention relates generally to a viscous fluid drive device. In particular, the present invention is concerned with a ramped clutch plate of a viscous fluid fan clutch for a vehicle.

2. Description of the Related Art

A thermostatically-controlled viscous fluid clutch assembly for driving and rotating a vehicle cooling fan is well-known. A multi-bladed fan is removably secured to a body of the clutch. The fan and clutch assembly are installed between an accessory pulley (typically the water pump pulley) of a vehicle engine and a radiator. The clutch drives the fan at high speeds close to input speed when cooling is required and permits the fan to rotate at low speeds when cooling is not required. Thermostatic control of the fan through the clutch reduces airflow noise caused by fan rotation and the load on an engine, resulting in horsepower gain and improved fuel economy.

A clutch plate, housed within the clutch, having lands and grooves is mated to the body having complementary lands and grooves. A pump plate divides the interior volume of the clutch into a pair of fluid chambers, a working chamber and a reservoir. Fill openings in the pump plate permit selective flow of a viscous fluid from the reservoir to the working chamber and into a shear zone between the lands and grooves of the body and clutch plate. Fluid shear at the lands and grooves transfers input torque from the clutch plate to drive the body and the attached fan.

When cooling is not required, the fill openings in the pump plate are closed and the fluid in the shear zone is pumped into a pumping chamber. Orifices in the pump plate permit passage of the fluid from the pumping chamber into the reservoir. Many conventional clutches employ wipers to enhance the pump-out of fluid from the pumping chamber. The removal of a majority of the fluid from the shear zone substantially reduces the shear between the clutch plate and the body, thereby substantially reducing the rotation of the fan.

Various types of wipers are known. Many clutches utilize separately-formed wipers which are mounted (welded) on the pump plate. While such wipers effectively increase pressure in a pumping chamber to enhance pump-out, they contribute additional material and assembly costs to the clutch. Other clutches utilize wipers stamped into the pump plate. Stamped wipers are less costly than separately-formed wipers but generally are not as efficient for pump-out.

The art continues to seek improvements. It is desirable that fluid in a clutch be effectively and efficiently pumped from a working chamber to a reservoir to disengage a clutch and reduce fan rotation upon thermostatic control.

SUMMARY OF THE INVENTION

The present invention includes a viscous fluid drive device particularly suitable for a fan clutch of a vehicle. The present fan clutch includes a ramped clutch plate which efficiently pumps fluid from a working chamber to a reservoir. The clutch plate includes two systems of ramps which can be used independently or in combination. The present clutch plate eliminates the need for costly conventional wipers provided on the pump plate.

In a preferred embodiment, a viscous fluid clutch includes a clutch plate rotatably driven by an input shaft. The clutch plate includes a plurality of concentric, annular lands and grooves in a rear face which are mated with complementary lands and grooves of a clutch body to form a shear zone. A plurality of passages are provided in the clutch plate lands and grooves for directing fluid from a reservoir to the shear zone. A first system of arcuate ramps are provided in a front surface of the clutch plate facing a pump plate of the clutch. The arcuate ramps are radially aligned with pump plate orifices and enhance the pump-out of fluid through the orifices. If desired, a second system of circumferential ramps can be provided about the periphery of the clutch plate to enhance the pump-out of fluid.

BRIEF DESCRIPTION OF THE DRAWINGS

FIG. 2 is an enlarged view of a portion of the clutch of FIG. 1 wherein the pump plate has been rotated to illustrate axial fluid flow from a pumping chamber through an orifice the pump plate.

FIG. 3 is a front view of the present clutch plate removed from the clutch of FIG. 1 illustrating a first system of arcuate ramps provided about the outer boundary of a front surface and a second system of circumferential ramps provided about the periphery of the clutch plate.

FIG. 4 is a sectional view taken alone line 4—4 of FIG. 3.

FIG. 5 is a developed, reduced end view of the present clutch plate along line 5—5 and the pump plate removed from the clutch of FIG. 1 illustrating a series of the arcuate ramps and fluid flow from the pumping chamber through an orifice in the pump plate.

DETAILED DESCRIPTION OF THE PREFERRED EMBODIMENT

Figure 1:
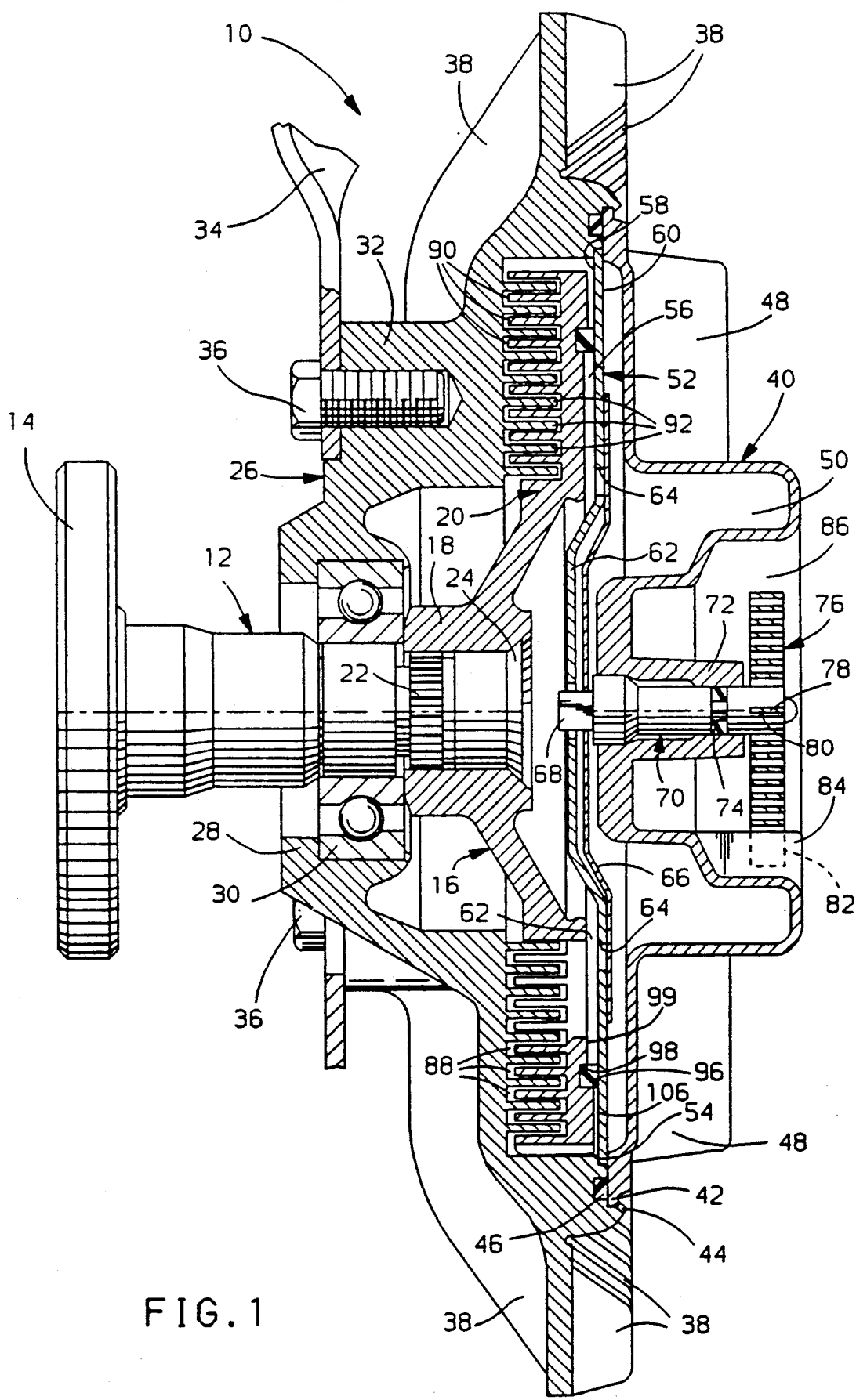
FIG. 1 is a sectional view of a viscous fluid fan clutch and attached fan incorporating a ramped clutch plate according to a preferred embodiment of the present invention.

A viscous fluid clutch indicated generally at 10 is illustrated in FIG. 1. The clutch 10 includes a rotatably driven input shaft indicated generally at 12. The input shaft 12, which can be provided with multiple steps as illustrated in FIG. 1, preferably terminates at its first or innermost end in a flange 14. The flange 14 is typically secured to a conventional engine water pump (not illustrated) to drive the clutch 10 as described below.

A clutch plate indicated generally at 16 includes a central hub portion 18 and an annular disk portion 20. The central hub portion 18 receives a knurled or serrated portion 22 of the input shaft 12 to provide an interference fit between the clutch plate 16 and the shaft 12. In this manner, the rotation of the input shaft 12 causes rotation of the clutch plate 16. A second end of the input shaft 12 can be machined as indicated at 24 to retain the clutch plate 16 on the input shaft 12. It is appreciated that other constructions, e.g., splining, can be utilized to drivingly connect the clutch plate 16 to the input shaft 12.

A housing indicated generally at 26 is a dished member having a hub portion 28 rotatably mounted on the input shaft 12 by a bearing set 30. A plurality of bosses 32 is formed on the exterior surface of the housing 26. A multi-bladed fan 34, partially illustrated in FIG. 1, is attached by threaded fasteners 36 to the bosses 32. A plurality of fins 38 is provided on the outer surface of the housing 26 to dissipate heat transferred from a viscous fluid (not illustrated) contained inside the clutch 10.

A cover indicated generally at 40 is a dished member having an annular outer edge 42 secured to the housing 26 by an annular retainer lip 44 spun over from the material at the outer periphery of the housing 26. An annular seal 46 is interposed between the edge 42 and a front face of the housing 26 to prevent leakage from the interior of the clutch 10. A plurality of fins 48 is provided on the outer surface of the cover 40 to dissipate heat transferred from the fluid. A fluid reservoir 50 is formed as an annular channel or chamber in the interior surface of the cover 40.

A disk-like pump plate indicated generally at 52 is mounted in the interior of the clutch 10. The pump plate 52 is positioned on a shoulder 54 of the housing 26 and then drivingly secured between the housing 26 and the cover 40 when the clutch 10 is assembled. The pump plate 52 separates a working chamber 56 from the fluid reservoir 50. In the view of FIG. 1, the working chamber 56 is the interior volume of the clutch 10 to the left of the pump plate 52. For purposes of this specification, a first or rear surface 58 of the pump plate 52 is in communication with the working chamber 56 and a second or front surface 60 of the pump plate 52 is in communication with the reservoir 50. The pump plate 52 includes a central depression 62 which is fitted into the hub portion 18 of the clutch plate 16.

A pair of diametrically opposed fill openings 64 are provided in the portion of the pump plate 52 radially outbound of the depression 62 and radially aligned with the reservoir 50. Hydraulic pressure causes the flow of fluid through the fill openings 64 from the reservoir 50 into the working chamber 56 as described below.

A rotatable control arm 66 controls the fluid flow into the working chamber 56 by covering and uncovering the fill openings 64. The control arm 66 is drivingly connected to a squared end 68 of a shaft 70 rotatably mounted in a tubular hub 72 formed in the cover 40. An O-ring seal 74 is mounted in an annular groove in the shaft 70 and makes peripheral contact with the inner wall of the hub 72 to prevent fluid leakage to the exterior of the clutch 10.

A bimetallic coil indicated generally at 76 is mounted at a first end 78 in a slot 80 on the forward end of the shaft 70. A second end 82 of the bimetallic coil 76 is mounted in a slot formed in a tab 84 on the exterior of the cover 40. Preferably, the bimetallic coil 76 is recessed within a cavity 86 surrounding the hub 72. The bimetallic coil 76 responds to the ambient air temperature surrounding the cover 40. An increase in air temperature causes the coil 76 to expand, thereby rotating the shaft 70 and the control arm 66 to uncover the fill openings 64 in the pump plate 52. When the air temperature has decreased to a predetermined level, the bimetallic coil 76 contracts, causing the shaft 70 and control arm 66 to rotate back to their original positions, thereby covering the fill openings 64 in the pump plate 52 and blocking fluid flow.

A fluid shear zone 88 is formed in the space between interleaved concentric annular lands or ridges 90 formed on a rear or inner surface of the disk portion 20 of the clutch plate 16 and corresponding concentric annular lands or ridges 92 formed on an interior surface of the housing 26. Fluid sheared in the shear zone 88 transmits input torque from the rotatably driven clutch plate 16 to provide hydraulic drive of the housing 26 and the attached fan 34.

Fluid flow through the shear zone 88 is illustrated best in FIG. 2. When the control arm 66 is rotated to uncover the fill openings 64, fluid flows from the reservoir 50 into the working chamber 56. Centrifugal forces of the rotating clutch 10 direct the fluid into a radial flow as indicated at directional arrow 94 between the pump plate 52 and the clutch plate 16. A blocking ring 96, preferably formed from polytetrafluoroethylene or a similar material, is provided in an annular groove 98 in a front surface 99 of the clutch plate 16. Radial flow 94 encounters the blocking ring 96 and is redirected to axial flow indicated at directional arrows 100 to flow through a plurality of passages 102 provided in the ridges 90 of the disk portion 20 of the clutch plate 16. Centrifugal forces cause the fluid to be dispersed radially outwardly throughout the shear zone 88. Fluid friction in the shear zone 88 transmits the rotation of the clutch plate 16 to the housing 26. As the housing 26 rotates, the attached fan 34 is rotated to draw cooling air through a radiator (not illustrated) and cool an internal combustion engine in a well-known manner.

Fluid exits the shear zone 88 as indicated at directional arrow 104 into an annular pumping chamber 106 formed and bounded by the clutch plate 16, the pump plate 52 and the blocking ring 96. Fluid indicated at directional arrow 109 is pumped from the pumping chamber 106 back to the reservoir 50 through a pair of diametrically opposed orifices 108 (only one of which is illustrated) provided in the pump plate 52.

A first pattern or system of arcuate ramps 110 are provided on the front surface 99 of the clutch plate 16 radially outbound of the annular groove 98. As illustrated in FIG. 5, each ramp 110 begins at a relatively low point 112 (with respect to the plane of the front surface 99) and gradually slopes upwardly to a relatively high point 114. A connecting wall 116 is formed at the intersection of a high point 114 and a low point 112. Each arcuate ramp 110 extends for a predetermined distance on the front face 99 bounded by the annular groove 98 and the outer circumference of the disk portion 20. In the embodiment illustrated in the drawings, six alternating arcuate ramps 110 are provided, each ramp 110 spanning approximately 60°. It is understood that other patterns of arcuate ramps 110 can be utilized.

When the clutch plate 16 is assembled in the clutch 10, the ramps 110 are radially aligned with the pumping chamber 106. As the clutch plate 16 rotates, the arcuate ramps 110 enhance the pump-out of fluid from the pumping chamber 106 through orifices 108 by increasing fluid pressure. Arcuate ramps 110 permit the clutch 10 to perform effectively without previously-utilized wipers on the pump plate 52.

If desired, a second pattern or system of ramps 120 can be provided on the circumference of the disk portion 20 of the clutch plate 16. Each ramp 120 begins at a relatively radial inner point or smaller diameter 122 and slopes outwardly to a relatively radial outer point or larger diameter 124. A connecting wall 126 is formed at the intersection of an inner point 122 and an outer point 124. Each circumferential ramp 120 extends for a predetermined distance around the periphery of the disk portion 20. In the embodiment illustrated in the drawings, six alternating circumferential ramps 120 are provided, each ramp 120 spanning approximately 60°. It is understood that other patterns of circumferential ramps 120 can be utilized.

During operation of the clutch, ramps 110 increase fluid pressure in the region of the working chamber 56 radially outbound of the clutch plate 16 and enhance the pump-out of fluid from the pumping chamber 106. Circumferential ramps 120 permit the clutch 10 to perform effectively without previously-utilized wipers on the pump plate 52.

In some embodiments, it may be desirable to provide only arcuate ramps 110 on the clutch plate 16. In other embodiments, only circumferential ramps 120 may be desired.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. A clutch plate for a viscous fluid clutch, adapted to be rotatably driven by an input shaft and aligned substantially parallel with a pump plate dividing the interior of the clutch into a working chamber containing the clutch plate and a fluid reservoir, comprising:
   (a) a central hub portion for receiving the input shaft and a disk portion having a first surface oriented toward the pump plate and a second opposite surface;
   (b) a plurality of concentric, annular lands and grooves in the disk portion second surface encircling the hub portion; and
   (c) ramp means, integrally formed in the disk portion first surface and not protruding substantially above a plane aligned with the first surface, for enhancing the pumping of fluid in the clutch.

2. The clutch plate specified in claim 1 wherein the ramp means comprises a pattern of arcuate sections, each of which begins at a relatively low point and slopes upwardly to a relatively high point.

3. The clutch plate specified in claim 1 including a plurality of passages in the lands and grooves for directing fluid in the clutch to the grooves.

4. A viscous fluid clutch comprising:
   (a) a rotatable clutch plate having a disk portion and driven by an input shaft;
   (b) housing means having a hollow interior containing the clutch plate;
   (c) a pump plate formed separately from and internally mounted in the housing means and aligned substantially parallel to the clutch plate disk portion to separate a reservoir formed in the housing means from a working chamber containing the clutch plate, wherein fluid in the working chamber transmits rotational drive from the clutch plate to the housing means;
   (d) a predetermined volume of viscous fluid stored in the reservoir which enters the working chamber through controlled fill openings provided in the pump plate and returns to the reservoir through orifices provided in the pump plate radially outbound of the fill openings; and
   (e) ramp means integrally formed on the clutch plate for enhancing the return of fluid through the fill openings including at least one arcuate ramp formed in a surface of the disk portion facing the pump plate radially aligned with the orifices and not protruding above a plane aligned with the surface.

* * * * *